No. 710,209. Patented Sept. 30, 1902.
J. PRATT.
SEWER TRAP.
(Application filed May 12, 1902.)
(No Model.)
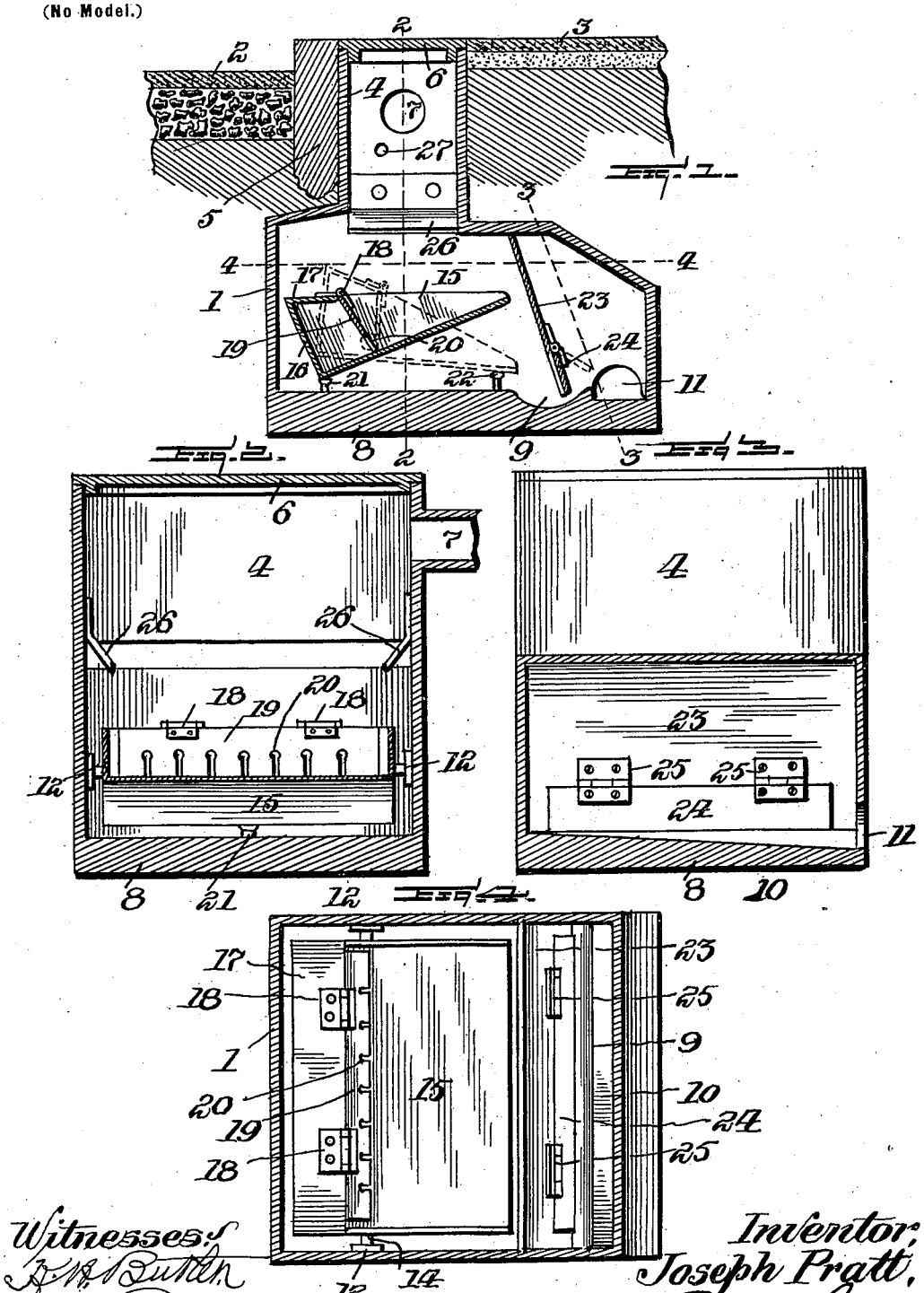

UNITED STATES PATENT OFFICE.

JOSEPH PRATT, OF McKEESPORT, PENNSYLVANIA.

SEWER-TRAP.

SPECIFICATION forming part of Letters Patent No. 710,209, dated September 30, 1902.

Application filed May 12, 1902. Serial No. 106,903. (No model.)

*To all whom it may concern:*

Be it known that I, JOSEPH PRATT, a citizen of the United States of America, residing at McKeesport, in the county of Allegheny and State of Pennsylvania, have invented certain new and useful Improvements in Sewer Flushes and Traps, of which the following is a specification, reference being had therein to the accompanying drawings.

This invention relates to certain new and useful improvements in sewer-traps, and has for its object to provide a combined sewer trap and flush.

The invention aims to construct a trap with means to receive the waste water and sediment from the building connection and deliver the same at intervals to the sewer proper in a manner which will permit of the flushing after each delivery, so as to insure all dirt, sediment, or the like which may be delivered to the sewer proper being effectually carried off through the same and prevented from clogging.

Briefly described, my invention comprises a casing which may be made of brick, masonry, slate, vitrified material, or other suitable material and which is in communication with the house connection. A tilting trap is arranged in this casing and is adapted to receive the discharge from the house connection, retaining the same a determined time, and then delivering it to the sewer proper, simultaneously flushing, so as to effectually carry any dirt or sediment through the sewer.

In the accompanying drawings I have shown a practical embodiment of my invention, and in describing the invention in detail reference is had to the drawings forming a part of this specification, and wherein like numerals of reference indicate like parts throughout the several views, in which—

Figure 1 is a central longitudinal sectional view of my improved trap and flush, showing the same in position. Fig. 2 is a transverse vertical sectional view taken on the line 2 2 of Fig. 1. Fig. 3 is a transverse vertical sectional view taken on the line 3 3 of Fig. 1. Fig. 4 is a horizontal sectional view taken on the line 4 4 of Fig. 1.

My improved trap and flush embodies a casing or box 1, which may be made of any suitable material and as in practice is located below the street 2 and pavement 3, and has an extension 4 ordinarily fitted against the inner side of the curb 5. This extension is closed at the top by a cover or trap-door 6, which is ordinarily flush with the pavement 3 and top of the curb 5. The house connection 7 discharges into the extension 4 at a convenient point, either on one or more sides of the same, as may be required, though in the present illustration I have shown a single house connection. The box or casing 1 has a suitable base 8, which is provided with a gutter 9 and an inclined discharge-chute 10, which is in communication, through the opening 11 in one of the side walls, with the sewer proper. (Not shown.) The side walls carry bearings 12, in which is journaled, by means of short shafts or trunnions 14, the trap 15, which is adapted to normally assume the position shown in full lines in Fig. 1 of the drawings. This trap 15 is substantially scoop-shaped in form, having a back wall 16 and a short overlying top wall 17, to which is secured, by means of hinges 18, the door 19, which is provided throughout its length with a series of openings 20 for the purpose as will presently appear. This trap 15 when in position as shown in full lines in Fig. 1 rests upon the stop or buffer 21, and when tilted to the position shown in dotted lines in Fig. 1, so as to discharge its contents, it engages a like stop or buffer 22, these stops or buffers 21 22 being mounted in the upper face of the base 8. The inclined partition-wall 23 is arranged in the box or casing 1 and is cut away at its lower edge, and in this cut-away portion is arranged a door 24, which is secured to the partition 23 by hinges 25, this door lying normally just above the gutter 9. To the opposite side wall of the extension 4 I preferably secure deflecting-plates 26, which are inclined, so as to cause the material discharged through the pipe 7 into the box or casing to be carried into the trap 15 and prevent it from falling down the side walls of the box or casing 1. I may also tap a water-pipe 27 into the extension 4 for feeding a continuous supply of water to the trap or for flushing the same at any time desired.

In operation the water, with any dirt or sediment that may be therein, is discharged through the house connection into the box or casing 1, where it is received in the trap 15, which holds the same until such time as the load in said trap is of sufficient weight to cause the same to tilt in the manner shown in dotted lines in Fig. 1 of the drawings, thus discharging the contents into the gutter 9 of the box or casing. As this gutter everflows the door 24 will be raised and the waste discharged into the inclined chute 10, where it is carried off into the sewer. Previous to the trap 15 being tilted the water which was contained in said trap would lie naturally in the lowest part thereof, or, in other words, in the rear of the trap-door 19, which door prevents the greater part of the sediment or waste from passing into the chamber thus provided for the water, so that the water will act as a flush for carrying out any dirt or sediment in the trap when the latter is tilted and washing the same out of the trap into the gutter 9. If the dirt and sediment as accumulated back of the door 19 are not sufficient to force this door out of the way when the trap is tilted, this dirt or sediment will be washed out through openings 20, the door 19 serving to prevent the too-free escape of the water contained in the back of the scoop-trap when the same is tilted. The dirt or sediment lying in the gutter 9 in excess of what was discharged during one flushing may be forced outwardly on the next flushing operation of the trap, the door 24 serving to prevent the dirt or sediment from being forced out in the discharge-chute and sewer in such quantities that there would not be sufficient water to carry the same away. Where a continuous supply of water is furnished through the water-pipe 27, the trap 15 will operate automatically to flush the sewer each time that the load is received within said trap, as will be apparent, and upon discharging each load will return to position shown in full lines until such time as it is again filled, when another flushing operation will take place.

It will be noted that various changes may be made in the details of construction without departing from the general spirit of my invention.

Having fully described my invention, what I claim as new, and desire to secure by Letters Patent, is—

1. In a sewer trap and flush, the combination with a box or casing in communication with the house connection, a tilting trap mounted in said box or casing, a hinged door carried by said trap, and means for limiting the tilting movement of the trap, substantially as described.

2. In a sewer trap and flush, a box or casing having the base provided with a gutter, and with a discharge-chute in communication with the sewer, a tilting trap mounted in the box or casing, a hinged door carried by said trap, a partition in the box or casing, and a hinged door carried by said partition, substantially as described.

3. In a sewer trap and flush, a box or casing in communication with the house connection, a tilting trap mounted in said box or casing, deflector-plates carried by the box or casing for discharging the material into the trap, a hinged door carried by said trap, and means for limiting the tilting movement of the trap, substantially as described.

4. In a sewer trap and flush, a box or casing in communication with the house connection, a water-supply pipe communicating with the box or casing, a tilting trap mounted in the box or casing, a partition in said box or casing, and a hinged door carried by said partition, substantially as described.

5. In a sewer trap, a box or casing having the base provided with a gutter and an inclined discharge-chute, combined with a tilting trap mounted in the box or casing, a partition in the box or casing, and a hinged door carried by said partition lying above the gutter, substantially as described.

In testimony whereof I affix my signature in the presence of two witnesses.

JOSEPH PRATT.

Witnesses:
E. E. POTTER,
A. M. WILSON.